United States Patent
Hartwich et al.

(10) Patent No.: US 10,146,725 B2
(45) Date of Patent: Dec. 4, 2018

(54) METHOD AND DEVICE FOR CHECKING THE CORRECT FUNCTIONING OF A SERIAL DATA TRANSMISSION

(75) Inventors: Florian Hartwich, Reutlingen (DE);
Franz Bailer, Moessingen (DE);
Christian Horst, Dusslingen (DE);
Arthur Mutter, Leinfelden (DE)

(73) Assignee: ROBERT BOSCH GmbH, Stuttgart (DE)

(*) Notice: Subject to any disclaimer, the term of this patent is extended or adjusted under 35 U.S.C. 154(b) by 973 days.

(21) Appl. No.: 14/342,282

(22) PCT Filed: Aug. 24, 2012

(86) PCT No.: PCT/EP2012/066469
§ 371 (c)(1),
(2), (4) Date: Jul. 28, 2014

(87) PCT Pub. No.: WO2013/030095
PCT Pub. Date: Mar. 7, 2013

(65) Prior Publication Data
US 2014/0337549 A1    Nov. 13, 2014

(30) Foreign Application Priority Data

Aug. 29, 2011 (DE) .................. 10 2011 081 733
Jan. 24, 2012 (DE) .................. 10 2012 200 997

(51) Int. Cl.
*G06F 13/42* (2006.01)
*G06F 13/362* (2006.01)
(Continued)

(52) U.S. Cl.
CPC ........ *G06F 13/4282* (2013.01); *G06F 13/362* (2013.01); *H04L 12/4013* (2013.01); *H04L 12/4135* (2013.01); *H04L 2012/40215* (2013.01)

(58) Field of Classification Search
CPC .............. G06F 13/4282; G06F 13/362; H04L 12/4013; H04L 12/4135; H04L 2012/40215
See application file for complete search history.

(56) References Cited

U.S. PATENT DOCUMENTS 4,794,376 A * 12/1988 Lloyd, Jr. .............. G08B 29/16
340/507
5,469,150 A * 11/1995 Sitte ..................... G05B 19/054
340/3.1
(Continued)

FOREIGN PATENT DOCUMENTS

DE   102004062210 B3   5/2006
EP   2521319            11/2012
(Continued)

OTHER PUBLICATIONS

International Search Report for PCT/EP2012/066469, dated Dec. 6, 2012.
(Continued)

*Primary Examiner* — Brian T Misiura
*Assistant Examiner* — Herve Iradukunda
(74) *Attorney, Agent, or Firm* — Norton Rose Fulbright US LLP; Gerard Messina

(57) ABSTRACT

A method is described for checking the correct functioning of a serial data transmission in a bus system having at least two bus users. The bus users are connected to the bus via a bus connection unit and exchange messages via the bus. The sending access to the bus for each message is granted to a bus user via the arbitration process according to CAN standard ISO 11898-1, this bus user becoming the sender for this message. The messages have a logic structure according to the CAN standard, i.e., are composed of a start of frame bit, arbitration field, control field, data field, CRC field, acknowledge field, and end of frame field. The correct
(Continued)

functioning of the data transmission is checked during the transmission by comparing a transmission signal, sent to the bus connection unit, to the reception signal (CAN_RX) received by the bus connection unit. The method is characterized in that a transmission signal (CAN_TX_DEL), which is delayed by a delay time (T_DELAY) compared to the transmission signal (CAN_TX), is held in the sender, and the undelayed transmission signal (CAN_TX) or the delayed transmission signal (CAN_TX_DEL) is used for checking the correct functioning of the data transmission, as a function of a switchover.

38 Claims, 5 Drawing Sheets

(51) Int. Cl.
*H04L 12/40* (2006.01)
*H04L 12/413* (2006.01)

(56) References Cited

U.S. PATENT DOCUMENTS

| | | | | |
|---|---|---|---|---|
| 6,516,183 | B1* | 2/2003 | Hellmark | H03D 3/008 375/346 |
| 6,647,027 | B1* | 11/2003 | Gasparik | G06F 13/423 370/519 |
| 7,085,276 | B1* | 8/2006 | Heitmann | G06F 1/14 370/395.4 |
| 7,299,098 | B2* | 11/2007 | Gruenewald | G05B 19/042 700/18 |
| 2003/0226065 | A1* | 12/2003 | Shingaki | H04L 1/243 714/43 |
| 2006/0123176 | A1 | 6/2006 | Fredriksson et al. | |
| 2008/0075156 | A1* | 3/2008 | Schumacher | G06F 11/1004 375/226 |
| 2008/0219252 | A1* | 9/2008 | Narasimhaprasad | H04L 12/2803 370/389 |
| 2008/0270747 | A1* | 10/2008 | Pfeiffer | G06F 9/30181 712/20 |
| 2010/0008456 | A1* | 1/2010 | Rohatschek | H04L 25/08 375/354 |
| 2010/0034100 | A1* | 2/2010 | Beyers | H04L 41/065 370/250 |
| 2010/0150176 | A1* | 6/2010 | Yakashiro | H04L 12/40006 370/475 |
| 2010/0158045 | A1* | 6/2010 | Shin | H04L 12/40071 370/473 |
| 2011/0122790 | A1* | 5/2011 | Ogawa | H04L 43/0858 370/252 |

FOREIGN PATENT DOCUMENTS

| | | |
|---|---|---|
| TW | 201016512 A | 5/2010 |
| TW | 201246869 A | 11/2012 |
| WO | WO 2013/030095 | 3/2013 |
| WO | 2016016163 A1 | 2/2016 |

OTHER PUBLICATIONS

Bosch GmbH, "CAN with Flexible Data-Rate", CAN with Flexible Data-Rate White Paper, Version 1.1, pp. 1-16, 2011.
Cena G et al., "Overlooking of Controller Area Networks", Electronics Letters, vol. 35, No. 22, pp. 1923-1925, 1999.
Road Vehicles-Controller Are Network (CAN)—Part 1: Data Link Layer and Physical Signalling, vol. msc.upamd, 1-52, 2010.

* cited by examiner

METHOD AND DEVICE FOR CHECKING THE CORRECT FUNCTIONING OF A SERIAL DATA TRANSMISSION

FIELD OF THE INVENTION

The present invention relates to a method and a device for serial data transmission between at least two users in a bus system.

BACKGROUND INFORMATION

The controller area network (CAN) as well as an extension of the CAN, referred to as "time triggered CAN" (TTCAN), also collectively referred to below as the CAN standard, are known from the standards of the ISO 11898-1 through 11898-1 family, for example. The media access control process used in the CAN is based on bitwise arbitration. In the CAN, the bitwise arbitration is carried out based on a leading identifier within the message to be transmitted via the bus.

During the bitwise arbitration, multiple user stations may simultaneously transmit data via the bus system without interfering with the data transmission. At the same time, the user stations may ascertain the logic state (0 or 1) of the bus (reception signal) during transmission of a bit via the bus (transmission signal). For this purpose, the transmission signal sent on the transmission channel is continuously compared to the reception signal. If there is no match at a certain point in time (the sample point), the bus user terminates the transmission operation, since it must be assumed that another bus user is attempting to transmit a message having a higher priority or a lower-level identifier. The reception signal represents a superimposition of the message bits of all bus users which are attempting to gain access to the bus during the arbitration. Due to the propagation times of the signals on the bus lines and due to intrinsic delay times in the bus connection units (transceivers), the result of the superimposition of these signals is not present until late within the bit time period, so that the sample point must be relatively far back within the bit time period. Among other things, this fact limits the allowable bit lengths in the CAN at the lower end. Shortening is not easily possible.

After a user station has completely sent the identifier, it is established that this station has attained the arbitration and thus has exclusive access to the bus. According to the protocol specification of the CAN, other user stations are not allowed to send data via the bus until the sending user station has transmitted a check sum field (CRC field, CRC check sum) of the message. Thus, the end time of the transmission of the CRC field corresponds to an end of an interval in which the transmitting user station views as a reception signal only the transmission signal which that user station itself has sent, which is delayed essentially only by the intrinsic delay time of the bus connection unit. The described comparison between the transmission signal and the reception signal is further carried out in this interval, and is used to detect errors in the transmission of the data and to determine error messages by other bus users.

Use of the protocol results in an interference-free, secure transmission via the bus of that message whose sender has attained the arbitration process. The CAN protocols are particularly suited for transmitting brief messages under real-time conditions, whereby it may be ensured, by suitable assignment of the identifiers, that for particularly important messages arbitration is almost always attained, and the corresponding message is successfully sent.

For example, a high level of transmission security and reliability in error recognition is provided by transmitting a CRC field, formed from the data previously sent in the message, with the aid of a generator polynomial, and carrying out a CRC check on the receiver side, and by continuously checking the match between the transmission signal and the reception signal.

The increasing interlinking in recent vehicles and the advent of additional systems for enhancing driving safety or driving comfort, for example, have resulted in greater demands on the data volumes to be transmitted, the transmission rate, the transmission security, and the allowable latencies for the transmission. Examples include vehicle dynamics control systems such as the electronic stability program (ESP), driver assistance systems such as adaptive cruise control (ACC), or driver information systems such as traffic sign recognition (see, for example, the descriptions in "Bosch Kraftfahrtechnisches Handbuch (Automotive Handbook)," 27th Edition, 2011, Vieweg+Teubner).

The document "CAN with Flexible Data Rate, White Paper, Version 1.0" posted on the Internet site http://www.semiconductors.bosch.de/ on May 2, 2011 presents a modified data transmission protocol which, among other things, allows an expansion of the data field, as well as a shortening of the bit length for a portion of the CAN message after completed arbitration. In this area, the shortening of the bit length is limited, among other factors, by the intrinsic delay time of the bus connection units, since before a bit is transmitted, the match between the transmission signal and the reception signal must be checked for the preceding bit. It has been found that the related art does not provide satisfactory results in every respect with regard to increasing the data transmission rate and/or security.

SUMMARY

The present invention together with its advantages is described below with reference to drawings and exemplary embodiments. The subject matter of the present invention is not limited to the illustrated and described exemplary embodiments.

The present invention is directed to a method for serial data transmission in a bus system having at least two bus users which exchange messages via the bus, the sending access to the bus for each message being granted to a bus user via the arbitration process according to CAN standard ISO 11898-1, this bus user thus becoming the sender for this message, and the messages having a logic structure according to the CAN standard, i.e., being composed of a start of frame bit, arbitration field, control field, data field, CRC field, acknowledge field, and end of frame field, and the correct functioning of the data transmission being continuously checked by comparing a transmission signal (CAN_TX), sent to the bus connection unit, to the reception signal (CAN_RX) received by the bus connection unit.

The method according to the present invention is characterized in that a transmission signal which is delayed, compared to the transmission signal, by a delay time is held in the sender, the undelayed transmission signal or the delayed transmission signal being used for checking the correct functioning of the data transmission, as a function of a switchover. In cases in which there is an essentially fixed time delay between the transmission signal and the reception signal, this time delay may thus advantageously be compensated for prior to the checking of the correct functioning of the data transmission.

The option for switching over, within the sending operation of a single message, between the use of the undelayed transmission signal and the use of the delayed transmission signal has the advantage that the method may be used in a targeted manner only in the areas in which an essentially fixed time delay between the transmission signal and the reception signal is present. In particular, it may thus be ensured that the switchover takes place at the earliest after the sending access has been granted to a bus user.

If the time delays which occur are essentially independent of external parameters such as temperature, etc., it may be advantageous for the delay time to be fixedly predefined or to be predefinable within the scope of an initial configuration, for example. In one particularly advantageous specific embodiment, the delay time is dynamically predefinable, and is a function of the ascertainment of a time delay. Continuous changes in the time delay during operation may thus be taken into account, which, among other things, increases the robustness of the method.

The mentioned ascertainment of a time delay advantageously includes the ascertainment in each case of at least one signal change or a signal edge in the undelayed transmission signal and in the reception signal, since these types of signal changes are particularly well suited for starting and ending a time measurement. It is also advantageous when, in addition to the delay time, a comparison point in time (T_CMP) for the checking of the correct functioning of the data transmission is also determined from the result of the time measurement, since this point in time may then be optimally adapted to the time delay that is present between the transmission signal and the reception signal, and in turn the robustness of the check may be increased. If the sum of the ascertained time delay and one-half the bit length is used here, scanning always takes place in the middle of the received signal. This is particularly advantageous for reliable scanning and checking of the reception signal.

When the switchover takes place as the result of reaching or evaluating a predefined or predefinable bit within the message which has just been sent, the method is particularly transparent and easy to implement. Switching over by applying a signal which is provided for this purpose has the advantage that the switchover may be made by the communication controller or microprocessor, for example, in a particularly flexible manner.

The messages which are to be checked using the method according to the present invention are advantageously identified by a suitable identifier, since the devices according to the present invention which exchange the messages may thus recognize whether the communication takes place according to the method according to the standard or the method according to the present invention. When this identifier is present, in one advantageous aspect the control field of the messages has more than six bits. It may thus be set up that the identification is provided by a recessive bit, which is followed by at least one dominant bit in all data messages. In this case, this edge between the recessive bit of the first identifier and the at least one subsequent dominant bit may be used for ascertaining the time offset between the undelayed transmission signal and the reception signal, which has the advantage that the accuracy of the ascertainment of the time delay is thus increased, in particular when the edges from "recessive" to "dominant" are particularly steep.

A simultaneous expansion of the data field of the messages according to the present invention to more than eight bytes has the additional advantage that larger data volumes may be transmitted within a message, and the ratio of useful data to protocol-relevant control data advantageously changes. For establishing the size of the data field, the values of the four bits of the data length code are then be interpreted differently from the CAN standard, at least in part.

Another advantage of the method according to the present invention results when in addition the bit length for at least one predefined or predefinable area within the message assumes a value that is shorter than the bit length previously used. A particular advantage of the method here is that bit lengths below the intrinsic time delay of the bus connection unit may also be used. Without the compensation according to the present invention, in this case the comparison between the undelayed transmission signal and the reception signal would erroneously result in recognition of a transmission error. Messages modified in this way may be made recognizable by a second identifier. In addition, the data volume transmitted per unit time may be further increased by this modification. The area advantageously begins at the earliest with the second identifier, and ends at the latest with the CRC delimiter. The different values of the bit length are advantageously implemented by using different scaling factors (prescalers) for setting the bus time unit relative to a smallest time unit or the oscillator clock pulse. The robustness of the method is further increased when different values for the bit timing parameters are used in the areas having a longer and a shorter bit length.

The second identifier has the advantage that the advantages of the two measures may also be utilized separately. For example, even when the switchover to a shorter bit length is not possible for reasons of the bus topology, in addition messages according to the method according to the present invention may be checked and sent at a higher data volume. Even when errors occur in messages having a shortened bit length, a switchover is initially made to the normal bit length without sacrificing the further advantages.

The method is advantageously usable during normal operation of a motor vehicle for transmitting data between at least two control units of the motor vehicle which are connected via a suitable data bus. However, the method is likewise advantageously usable during manufacture or maintenance of a motor vehicle for transmitting data between a programming unit, which for purposes of programming is connected to a suitable data bus, and at least one control unit of the motor vehicle which is connected to the data bus. Another advantageous field of application is in the operation of industrial control systems, in particular for long connecting lines. In all cases, the flexibility in the transmission rate is advantageous when at the same time there is very high transmission security, in order to adapt the transmission process to the particular conditions such as signal propagation times.

Another advantage is that only minimal changes have to be made to a CAN standard controller in order to operate according to the present invention. A communication controller according to the present invention, which may also operate as a CAN standard controller, is only insignificantly larger than a conventional CAN standard controller. The associated application program does not have to be changed, and advantages are even achieved in the speed of the data transmission.

Considerable portions of the CAN conformance test (ISO 16845) may advantageously be taken over. In one advantageous aspect, the transmission process according to the present invention may be combined with the extensions of TTCAN (ISO 11898-4).

DETAILED DESCRIPTION

Figure 1A:
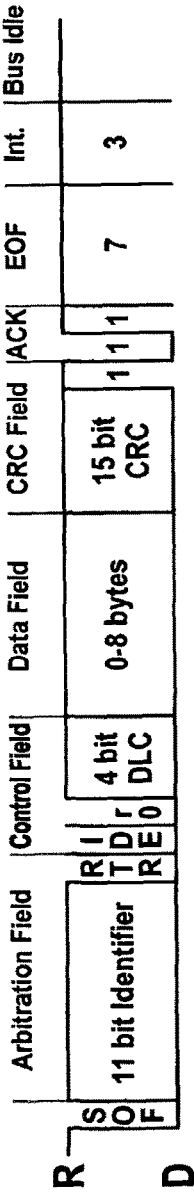
FIG. 1a shows the two alternatives for the structure of data messages according to CAN standard ISO 11898-1, the CAN standard format, and the CAN extended format.
Figure 1A:
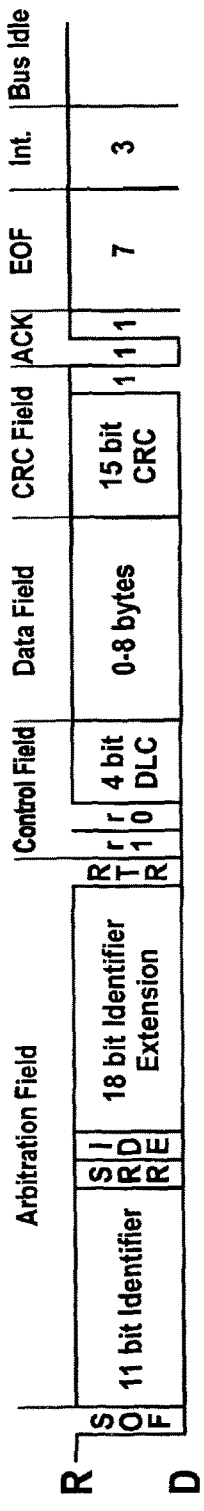

FIG. 1a illustrates the structure of messages such as those used on a CAN bus for data transmission. The two different formats "standard" and "extended" are illustrated. The method according to the present invention is applicable to both formats in suitable specific embodiments.

The message begins with a "start of frame" (SOF) bit which signals the start of the message. This bit is followed by a segment which is primarily used for identifying the message, and on the basis of which the users of the bus system decide whether or not they will receive the message. This segment is referred to as the "arbitration field," and contains the identifier. The segment is followed by a "control field" which contains, among other things, the data length code. The data length code contains information concerning the size of the data field of the message. This field is followed by the actual data field "data field," which contains the data to be exchanged between the users of the bus system. This field is followed by the "CRC field" having the 15-bit check sum and a delimiter, and subsequently two "acknowledge" (ACK) bits which are used to signal the successful reception of a message to the sender. The message is ended by an "end of frame" (EOF) sequence.

In order to transmit a message via the bus, during the arbitration process the customary checking method is carried out in which the undelayed transmission signal is compared to the reception signal, since in this phase multiple senders may still be participating on the bus, and therefore there is generally no fixed time relationship between the transmission signal and the reception signal. After completion of arbitration, when a bus user has acquired the role of the sender for a message, the robustness and accuracy of the comparison which is made between the transmission signal and the reception signal are thus increased, so that the time delay between the transmission signal and the reception signal, which is then essentially fixed, is compensated for.

Figure 2A:
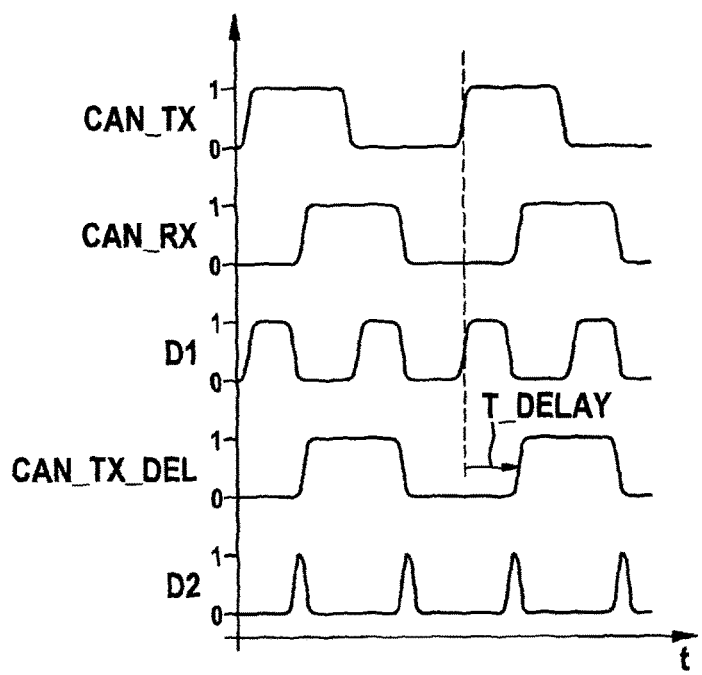
FIG. 2a shows an example of the delay according to the present invention of the transmission signal by a time period T_DELAY in order to compensate for the time delay of the reception signal caused, for example, by the bus connection unit.

The effect of the method according to the present invention is illustrated in greater detail in FIG. 2a. Reference characters CAN_TX and CAN_RX represent the time curve for the transmission signal and the reception signal, respectively, which are present at the corresponding pins of a device according to the present invention, for example a communication controller. The signals alternate between voltage values which correspond to a logical "1" and a logical "0." For the sake of simplicity, FIG. 2a shows only one bit sequence 1-0-1-0 via which the effect may be illustrated as an example. The exact signal curves, for example edge steepness, etc., are a function of details of the particular circuit which are not relevant to the schematic illustration of the effect of the method.

In the conventional method, a comparison or a check of the two logical signals CAN_TX and CAN_RX takes place via a suitable circuit, for example via an XOR gate, which for this purpose is held in an appropriate device. When there is a match of the input signals, this device delivers, for example, a logical "0" at the output, and when there is no match, delivers a "1." A resulting signal curve is qualitatively illustrated in FIG. 2a as signal D1. For checking the correct data transmission, linked signal D1 is scanned at a certain point in time (the sample point). As is apparent, the sample point is set in such a way that it falls within that range of each bit in which signal D1 indicates a "0." With an increasing delay between the transmission signal and the reception signal, this range becomes progressively smaller, and a suitable selection of the sample point, so that a "0" is scanned in signal D1 when there is a correct transmission, becomes increasingly more difficult.

To improve this situation and to increase the robustness, in the method according to the present invention the transmission signal is delayed by a predefined or predefinable delay time T_DELAY. For this purpose, the device according to the present invention preferably additionally contains a suitable delay unit. The result is likewise illustrated in FIG. 2a: a time-delayed transmission signal CAN_TX_DEL is obtained. If this delayed signal is supplied to the circuit according to the present invention, an XOR gate, for example, and is linked or compared to the reception signal there, a linked signal D2, likewise schematically illustrated in FIG. 2a, is obtained. Due to the compensation for the intrinsic time delay of the bus connection unit, signal D2 corresponds to a logical "0" in wide ranges. In the area of the signal changes, logical values "1" still occur in signal D2 due to inaccuracies in the signal levels or the compensated delay time. A suitable selection of the sample point is now easily possible, so that the result of the comparison reliably results in "0" when a data transmission has correctly taken place.

Due to the differing conditions during the arbitration (no essentially fixed time delay) and subsequently (an essentially fixed time delay), the described method is to be designed to be switchable, so that in the arbitration phase the customary checking method is used, while in the subsequent transmission phase, the checking method according to the present invention is carried out. In this subsequent transmission phase or in portions thereof, a switchover, which is subsequently still carried out, may also be made to shorter bit lengths. In this case, the method has the particular advantage that bit lengths may be used which are in the same order of magnitude or even below the intrinsic time delay of the bus connection unit. Without the compensation according to the present invention this is not possible, since the comparison between the undelayed transmission signal and the reception signal may then erroneously result in recognition of a transmission error.

The value of delay time T_DELAY may be designed to be either fixedly predefined or predefinable. Fixedly predefining is meaningful in particular when the bus connection unit used does not have a very wide variation in the intrinsic time delay. A predefinable delay time is meaningful when the intrinsic time delay has dependencies on certain variables that are present in the bus user. For example, a temperature dependency could be compensated for when temperature information is present in the bus user, and therefore different values of the delay time may be predefined as a function of temperature.

In one preferred specific embodiment, delay time T_DELAY used is based on a previously carried out measurement of the time offset between the transmission signal and the reception signal. For this purpose, for example, a recessive-dominant signal edge which is present within the messages after completed arbitration may be evaluated.

It is advantageous when a communication controller according to the present invention independently recognizes whether the communication of the bus system takes place according to the CAN standard or according to the method according to the present invention. One option in this regard is to use a bit within the arbitration field or the control field, which in the CAN standard is always transmitted with a fixed value, for the identifier, so that the communication controller may derive a first switchover condition from this first identifier as a function of the checking method to be used which is selected by the communication controller.

Figure 1B:
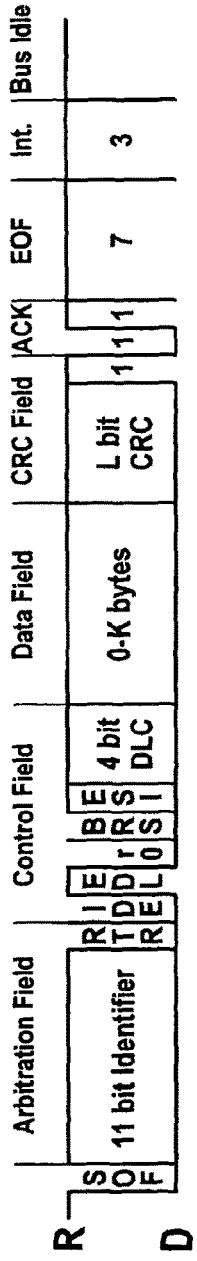
FIG. 1b shows two examples of the format of "CAN FD long" messages modified in comparison, having a modified control field and a flexible size of the data field and the CRC field. A modification of a standard CAN message as well as a modification of an extended CAN message are illustrated.
Figure 1B:
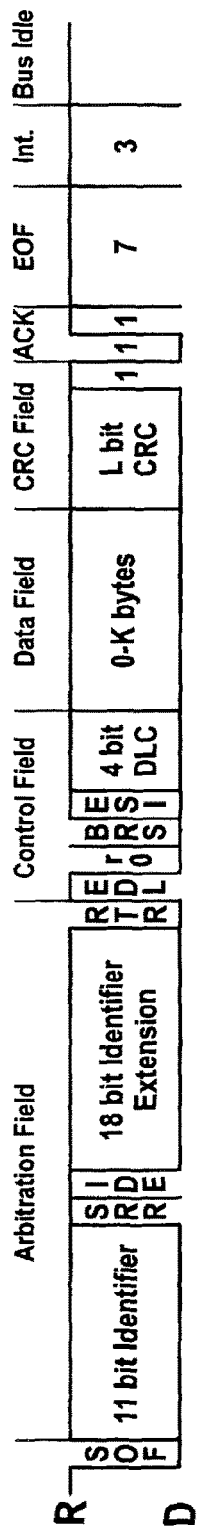

FIG. 1b illustrates modified message formats, each of which is derived from the two standard formats. These message formats differ from the messages according to the standard from FIG. 1a in that additional bits, in the present example EDL, BRS, ESI, have been added in the control field. In addition, the messages according to the present invention shown in the illustrated example differ from the messages according to the standard, in that the size of the data field and CRC field is variable, whereby the data field may also contain more than 8 bytes, namely, up to K bytes in the illustrated aspect. However, for implementing the method according to the present invention, the data field and the CRC field may also have a size according to the standard.

Identification with Standard Addressing:

In the standard format, as illustrated in the top part of FIG. 1a, the second bit of the control field of CAN standard data messages is always dominantly sent, and is denoted by r0. In the example, illustrated in the top part of FIG. 1b, of a message according to the present invention having standard addressing (i.e., having an arbitration field according to the CAN standard format), this second bit of the control field is used for the identifier, in that the second bit is recessively sent. In such a message, a recessive value of the second bit of the control field thus indicates that the checking method and message format which differ from the standard are subsequently used. This recessively transmitted second bit of the control field of a message having a standard arbitration field is denoted by EDL (extended data length). The r0 bit, which is always dominantly transmitted in the CAN standard, is replaced by the recessive EDL bit in the messages according to the present invention, or in the messages according to the present invention moves into a position at the rear, in the space between recessive bit EDL and bit BRS, which is likewise recessive during the switchover of the bit length. Furthermore, additional bits may still be inserted into the control field. FIG. 1b illustrates an example of a bit denoted by ESI. Two or more bits could also be inserted at this location without affecting the method according to the present invention.

Overall, in messages according to the present invention, the bit sequence in the control field of standard CAN standard messages {IDE, r0, DLC3, DLC2, DLC1, DLC0} is replaced by

{IDE, EDL, N additional bits, DLC3, DLC2, DLC1, DLC0}.

In the example illustrated in FIG. 1b, N=3 with inserted bits r0, BRS, ESI. However, N could also assume any other arbitrary values greater than zero.

Identification with Extended Addressing:

The first two bits of the control field of CAN standard data messages, as illustrated in the bottom part of FIG. 1a, are always dominantly sent in the extended format, and are denoted by r1 and r0. In the example of a message according to the present invention with extended addressing (i.e., with an arbitration field according to the extended CAN format) illustrated in the bottom part of FIG. 1b, first bit r1 of the control field is used for the identifier, in that it is recessively sent. In this case, a recessive value of the first bit of the control field in such a message indicates that the checking method and message format which deviate from the standard are subsequently used. Here as well, this recessively transmitted bit of the control field is denoted by EDL (extended data length). This bit replaces reserved dominant bit r1 of the CAN standard messages having an extended format. Alternatively, dominant bit r1 could also remain and be moved one spot toward the rear, so that the EDL bit would be inserted as an additional bit between RTR and r1. It would likewise be possible to insert the EDL bit (recessive) as an additional bit between r1 (dominant) and r0 (dominant). In this case, still additional bits may be subsequently inserted into the control field. FIG. 1b once again illustrates an example of the bit denoted by ESI. Two or more bits could also be inserted without affecting the method according to the present invention. Overall, in messages according to the present invention, the bit sequence in the control field of extended CAN standard messages {r1, r0, DLC3, DLC2, DLC1, DLC0} is replaced by

{EDL, N additional bits, DLC3, DLC2, DLC1, DLC0} or

{r1, EDL, M additional bits, DLC3, DLC2, DLC1, DLC0}.

The example illustrated in FIG. 1b shows the first-mentioned variant where N=3, namely, with inserted bits r0, BRS, ESI. However, N and M could also assume any other arbitrary values greater than zero.

Figure 2B:
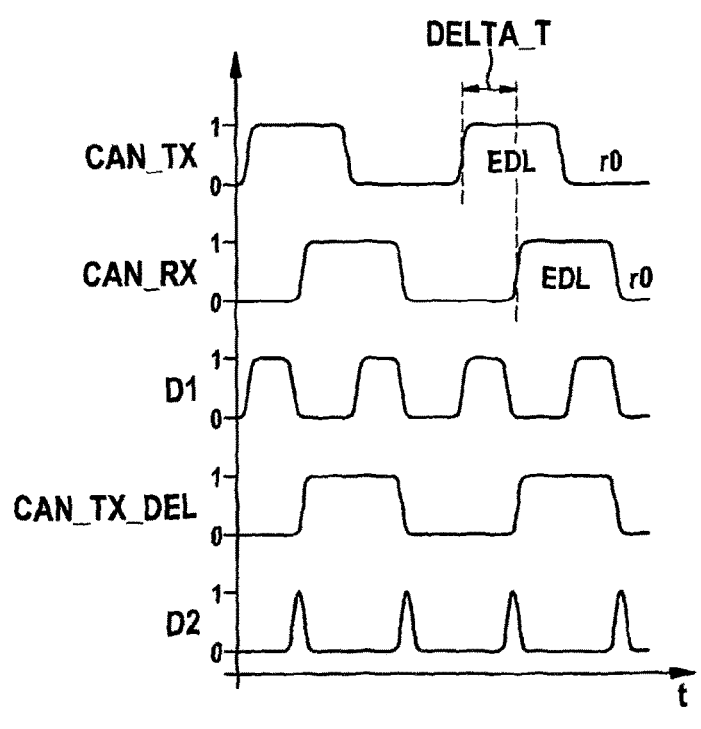
FIG. 2b schematically shows the measurement of time delay DELTA_T between transmission signal CAN_TX and reception signal CAN_RX, based on an established signal edge from a recessive bit to a dominant bit.

For messages having an identifier or a format of the type described above, a measurement of the actual time offset between the transmission signal and the reception signal may be carried out as illustrated in FIG. 2b: when the inserted bits are suitably selected, an edge from recessive to dominant is always present, for example, between the recessive bit of identifier EDL and subsequent bit r0. In messages identified according to the present invention, a continually recurring edge from recessive to dominant may be forced in some other way, for example by inserting corresponding reserved bits. Such an edge is well suited for the time measurement. Actual time delay DELTA_T, as depicted in FIG. 2b, may be measured for each individual message, for example, in that this edge of the transmission signal starts a counter, and the corresponding edge of the reception signal stops this counter.

Alternatively, a continually recurring edge from dominant to recessive may be used. An appropriate measurement may be carried out at regular intervals, or only once. The regular measurement of the time delay, which in particular takes place for each message, has the advantage that changes in the actual time delay, which may result from temperature influences, for example, may be reliably compensated for.

Figure 1C:
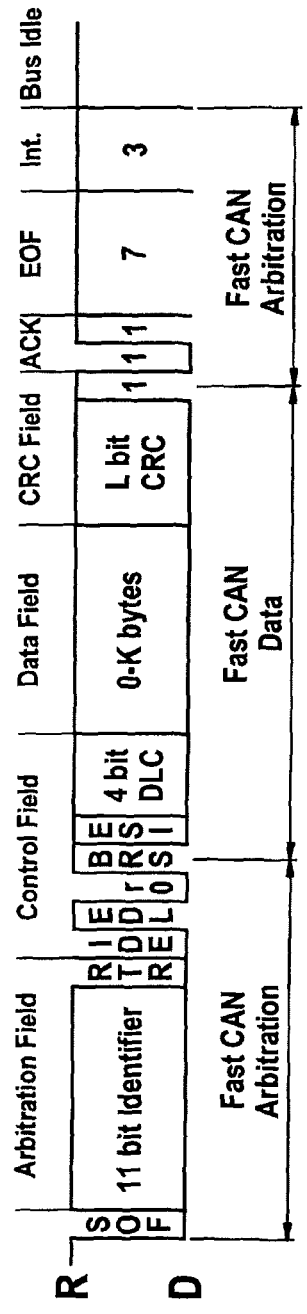
FIG. 1c shows two further examples of messages, modified in the data transmission process according to the present invention, of the "CAN FD fast" type, in which, compared to FIG. 1b, areas within the message in which a different bit length is used are additionally established.
Figure 1C:
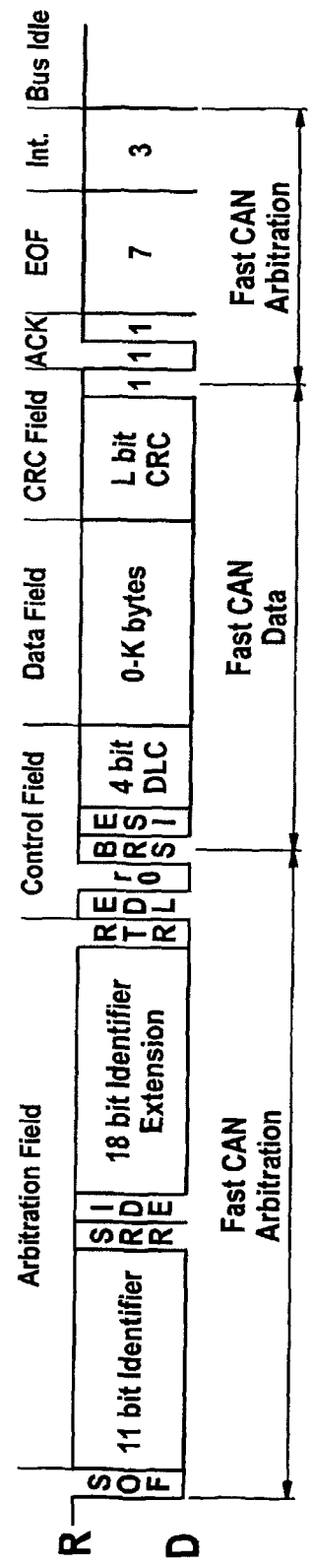

As already stated, it is advantageous when a recessive-dominant signal edge, which is present within the messages after completed arbitration, is evaluated for ascertaining DELTA_T. Since it is certain here that there are no longer any competing senders on the bus, an essentially fixed time relationship between the transmission signal and the reception signal is present for the bus user remaining as the sender. If, for example, the bits inserted into the control field are selected as illustrated in FIG. 1c, the recessive-dominant signal edge between the EDL bit and the r0 bit is the only continuously falling edge in a CAN FD message, prior to the start of the transmission of the data field, in which it is certain that there are no longer any competing senders. A determination of DELTA_T based on this signal edge thus provides a good result, provided that no other interferences occur on the bus.

Such other interferences which may adversely affect the quality of the measurement of internal delay DELTA_T of the bus connection unit may be caused, for example, by line disturbances of all types, electromagnetic irradiation, inductive or capacitive coupling, or the like. An interference during the measurement may on the one hand result in the sender erroneously determining a bit error and aborting the transmission of the message. On the other hand, however, an incorrectly measured value for DELTA_T may also be ascertained and not recognized as incorrect. The result of the subsequent compensation of the time delay would become worse in any case. To reduce the influence of a single error on the method in the ascertainment of DELTA_T, a mean value DELTA_T_MEAN is therefore advantageously formed from multiple measurements of DELTA_T in order to obtain a more reliable result.

A mean value DELTA_T_MEAN is formed from multiple values ascertained in succession, for example, measured values DELTA_T formed from multiple messages sent in succession which are ascertained based on the edge of the EDL bit. For the mean value formation, all possible averaging or filtering methods known to those skilled in the art for such tasks, for example a weighted or unweighted sliding mean value formation, may be used.

In one particularly advantageous specific embodiment, those measured values which greatly deviate from the last determined mean value are sorted out during the mean value formation. These values are very likely based, for example, on a faulty measurement and may therefore be discarded. The threshold value for the difference or the limiting value for the ratio of an instantaneously present measured value and last determined mean value DELTA_T_MEAN above which the deviation from, or the ratio to, the mean value for which the absolute value has been classified as excessively large is advantageously settable.

For the sliding mean value formation, for example, a suitable memory area for managing a list of N entries DELTA_T_1, . . . , to DELTA_T_N is reserved in the corresponding communication controllers. This list of the considered measured values operates, for example, as FIFO; i.e., the particular most recent measured value replaces the particular oldest measured value. By use of a suitable controller, the values in the list result in desired mean value DELTA_T_MEAN, as previously stated, for example as the arithmetic mean value, the weighted mean value, the root mean square, or according to some other method which may be provided in hardware. The mean value is then provided in a memory for use for the method according to the present invention.

After start-up, the described list of N measured values from which the mean value is to be formed is initially empty or has random entries. Since mean value DELTA_T_MEAN is to be formed using a method provided in hardware or a controller from list entries DELTA_T_1, . . . , through DELTA_T_N, a procedure is established concerning how the desired mean value is formed when some list entries are not yet valid. For example, the following three strategies may be used:

Strategy 1: The hardware is enhanced in such a way that the list entries are released via appropriate measurements before they take part in the mean value formation. Thus, in the first step the mean value formation is carried out using only one measured value (DELTA_T_1, for example, provided that this value is first to be filled by a measurement), then using two measured values in the second step, and so forth, until all list entries are based on measurements and are accordingly released. The logic system necessary for this procedure makes the circuit larger.

Strategy 2: All recessive-dominant edges are measured upon system start-up at the beginning of a message up to the edge between the EDL bit and the r0 bit, so that, provided that list length N is smaller than the number of recessive-dominant edges occurring in the message up to that point, all list entries of more or less precise individual measurements of time delay DELTA_T originate already in the first mean value formation. The circuit is only negligibly enlarged here.

Strategy 3: To initially fill the list, first measured value DELTA_T_1, ascertained at the desired edge, i.e., at the recessive-dominant edge between the EDL bit and the r0 bit, for example, is entered in all list positions. The additional measured values are then successively entered into list places 2 through N. Here as well, the circuit is only negligibly enlarged.

In all three cases, after the measured values which deviate excessively from last formed mean value DELTA_T_MEAN are sorted out, the method, if it is provided at all, may be suspended at least until all list entries are based only on measurements at the desired edge (the EDL-r0 edge, for example) of different messages.

In the following discussion, "DELTA_T" may also refer to value DELTA_T_MEAN generated from multiple measured values as a result of the mentioned mean value formation.

Delay time T_DELAY is then derived from ascertained time delay DELTA_T or mean value DELTA_T_MEAN, and, for example, is filtered or corrected, or modified or rounded to integral multiples of a certain time basis, for example the bit length. In one particularly simple specific embodiment, delay time T_DELAY is provided by the quotient (DELTA_T/bit length), rounded to the nearest whole number, multiplied by the bit length. For a measured time delay DELTA_T of 150 nanoseconds and a bit length of 250 nanoseconds, for example (corresponding to a baud rate of 4 Mbit/s), delay time T_DELAY would thus be 250 nanoseconds. In contrast, for a measured time delay DELTA_T of 100 nanoseconds, a value of T_DELAY of zero would result.

Delay time T_DELAY generated in this way is used as an input variable for the delay unit, set up for this purpose, in order to provide a transmission signal CAN_TX_DEL which is delayed by this time T_DELAY, starting from original transmission signal CAN_TX, as illustrated in FIG. 2a. If delayed transmission signal CAN_TX_DEL, or the XOR linkage together with reception signal CAN_RX, is used for the comparison, the influence of the intrinsic time delay of the bus connection unit on the result is significantly reduced, as is apparent from result signal D2 schematically illustrated in FIG. 2a.

In one advantageous specific embodiment, the switchover to the checking method according to the present invention, which uses the delayed transmission signal, takes place in a measurement of the time delay carried out immediately afterward, for example at the sample point of bit r0 or the sample point of subsequent bit BRS. However, the switchover may also be made at a later point in time, for example at one of the additional inserted bits in the control field. If a switchover is made in the message to shorter bit lengths at a later point in time, it is advantageous for the switchover to be carried out, using the checking method according to the present invention, no later than the switchover to shorter bit lengths. In this case, the switchover occurs at the earliest after the change to the long bit lengths, but may also occur only after the transmission of the message is completed.

The edge from recessive to dominant may also be used for improving the synchronization between the bus users, which is particularly advantageous for a switchover to shorter bit lengths.

In the CAN transmission process according to the standard, the data field may contain a maximum of 8 bytes, i.e., 64 bits of data. The data length code according to the standard contains four bits, i.e., may assume 16 different values. From this value range, only eight different values for the different sizes of the data field, from 1 bytes to 8 bytes, are used. A data field of 0 bytes is not recommended in the CAN standard, and sizes above 8 bytes are not allowed.

Contrary to the CAN standard, in the messages illustrated in FIG. 1b, additional values, which the data length code may assume, are utilized to identify larger data fields. For example, for the values of the data length code greater than 0b1000 and up to 0b1111, the associated sizes of the data field may increase by a larger increment than one byte, for example two, three, or four bytes, or may increase by irregular values. The association of these values of the data length code with sizes of the data field may be essentially freely set. The messages are denoted as "CAN FD long."

If, as described, the data field of messages is enlarged, it may be meaningful to also adapt the used method to the cyclic redundancy check (CRC) in order to obtain adequate error protection. In particular, it may be advantageous to use a different CRC polynomial, for example a higher-order polynomial, and to correspondingly provide a CRC field having a different size in the messages modified according to the present invention. This is illustrated in FIG. 1b, in that the CRC field of the messages according to the present invention has a length of L bits in the illustrated example, whereby, in a departure from the CAN standard, L may be unequal to 15, in particular greater than 15.

In one advantageous specific embodiment, the communication controller is designed in such a way that it is compatible with the CAN standard, i.e., it operates in a CAN standard bus system according to the standard, while in a bus system which is modified according to the present invention, the communication controller uses the checking method according to the present invention, allows larger data fields in the messages, and also carries out a computation and checking of the CRC code which is adapted thereto.

Since at the beginning of the reception of a message it is not yet certain whether a standard-conformant CAN message or a message which is modified according to the present invention has been received, in a communication controller according to the present invention multiple CRC shift registers are implemented which operate in parallel. After the reception of the CRC delimiter, when the CRC code is evaluated in the receiver, due to the additional identifier according to the present invention it is certain which transmission process has been used, and the shift register associated with this transmission process is then evaluated. As previously described, the additional identifier may match the first identifier, which concerns the size of the data field and the interpretation of the data length code.

At the beginning of the transmission of a message, the sender is already certain of which transmission process is to be used for the transmission. However, since it is possible that the arbitration may lose bus access and the started message may not be sent, and instead another message is received, here as well multiple CRC shift registers are controlled in parallel.

FIG. 1c shows two additional examples of messages modified according to the present invention, in which, in contrast to FIG. 1b, additional areas are established within the message in which a different bit length is used according to the present invention, and therefore the individual bits are transmitted more quickly via the bus. The messages are denoted as "CAN FD fast." For the two possible addressing variants of messages, the standard format and the extended format, areas are depicted in FIG. 1c in which a switchover is made between two states, denoted as "fast CAN arbitration" and "fast CAN data." As a result of this switchover between the two states, for the corresponding portion of the message the bit lengths are shortened, and therefore the individual bits are transmitted more quickly via the bus. The transmission time for a message may thus be shortened compared to the method according to the standard. The associated change of the temporal bit length may be implemented, for example, by using at least two different scaling factors (prescalers) for setting the bus time unit relative to a smallest time unit or the oscillator clock pulse during continuous operation. The switchover of the bit length as well as the corresponding change of the scaling factor are likewise illustrated as examples in FIG. 1c.

The transition between the states of fast CAN arbitration and fast CAN data occurs in messages having first identifier EDL, as a function of a second identifier which signals to the users of the data transmission that the shortened bit length is used. The second identifier occurs chronologically after the first identifier within the message. In the exemplary embodiment illustrated here, the position of this identifier is an additional bit in the control field, which is denoted as BRS (bit rate switch). In the example shown, this bit is transmitted as the fourth bit of the control field.

If, as described, a switchover is made to shorter bit lengths within the message, it is advantageous for the switchover to the checking method according to the present invention to be carried out no later than the switchover to shorter bit lengths. In one preferred specific embodiment of the method, the switchover to the checking method according to the present invention takes place simultaneously with the transmission of second identifier BRS.

Figure 2C:
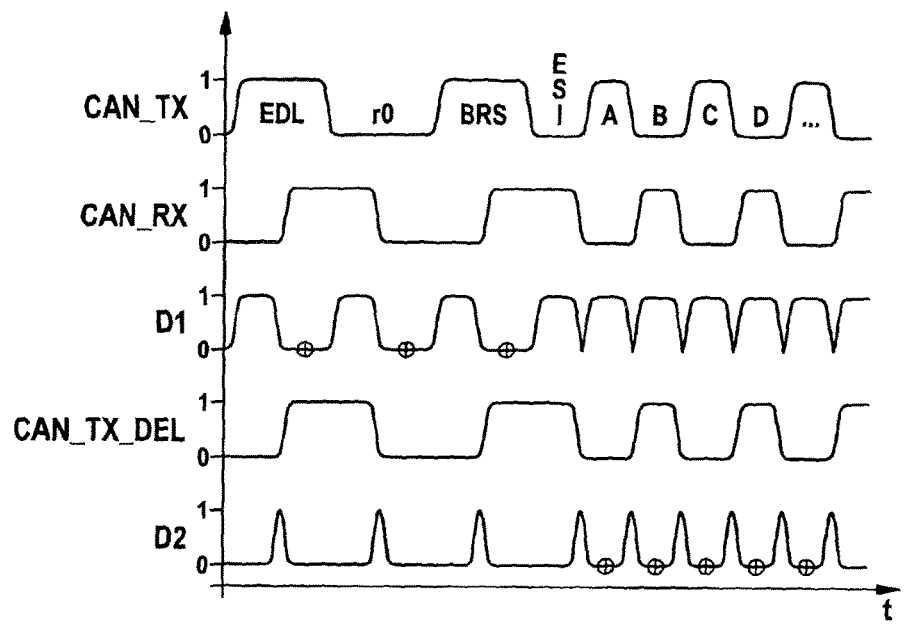
FIG. 2c schematically illustrates the influence of the compensation according to the present invention for the time delay of the transmission signal, using the present method for checking the correct data transmission.

This is schematically illustrated in FIG. 2c. In the illustrated segment, transmission signal CAN_TX includes bit sequence EDL, r0, BRS, ESI, A, B, C, D. Bits A, B, C, D may be the four bits of the data length code, or also other, additionally inserted bits of the control field. Reception signal CAN_RX is delayed by time delay DELTA_T, which may be ascertained based on the edge between EDL and r0, as illustrated in conjunction with FIG. 2b. XOR-linked signal D1 is evaluated at the sample point (denoted by crosses) in order to check the successful transmission. A switchover to a shorter bit length is made at the sample point of the BRS bit. Since in the illustrated case the shorter bit length has a length that is comparable to time delay DELTA_T, signal D1 now delivers a "1" signal almost continuously, which corresponds to a nonmatch between the transmission signal and the reception signal. Checking of the correct transmission based on signal D1 is no longer possible.

Transmission signal CAN_TX_DEL, which is delayed by delay time T_DELAY, is likewise illustrated in FIG. 2c. A value for delay time T_DELAY is generated from ascertained time delay DELTA_T, or the prior present value is updated using the result of the measurement. However, a predefined value may also be used. The XOR linkage from delayed transmission signal CAN_TX_DEL and reception signal CAN_RX, illustrated in FIG. 2c as signal D2, delivers a comparison signal, which over a sufficient time period signals a value "0," i.e., a match between the transmission signal and the reception signal. Robust checking of the data transmission is possible when the comparison point in time, once again denoted by crosses, is suitably selected.

It may thus be ensured that for the shorter bit lengths, the intrinsic time delay of the bus connection unit does not adversely affect the result of the comparison. In this specific embodiment, the switchover back to the checking and transmission process according to the standard takes place immediately after reaching the bit which is established for the switchover, for example the CRC delimiter bit, or when a reason for starting an error frame has been recognized.

In principle, according to the standard the duration of a bit or bit length is broken down into the following nonoverlapping segments:
SYNCHRONIZATION SEGMENT (SYNC_SEG)
PROPAGATION TIME SEGMENT (PROP_SEG)
PHASE BUFFER SEGMENT1 (PHASE_SEG1)
PHASE BUFFER SEGMENT2 (PHASE_SEG2),
which have the following functions:
Segment SYNC_SEG is used for synchronizing the various bus users. Edges of the bus signal are anticipated in this segment.
Segment PROP_SEG is used for compensating for physical delay times within the network.
Segments PHASE_SEG1 and PHASE SEG2 are used for compensating for deviations in the location of the signal edges. These segments are dynamically adapted within the scope of the resynchronization. The sample point is present at the end of PHASE_SEG1.

In the method according to the present invention, the lengths of the individual segments for the areas of different bit lengths are provided a number of times, in the illustrated example twice, and are stored in two configuration registers, for example. In particular the position of the sample point may thus be configured differently, depending on the bit length. In addition, in the configuration which is used in the area of shorter bit lengths, the propagation segment may be minimized or configured to length zero in order to shorten the bit length.

Figure 3:
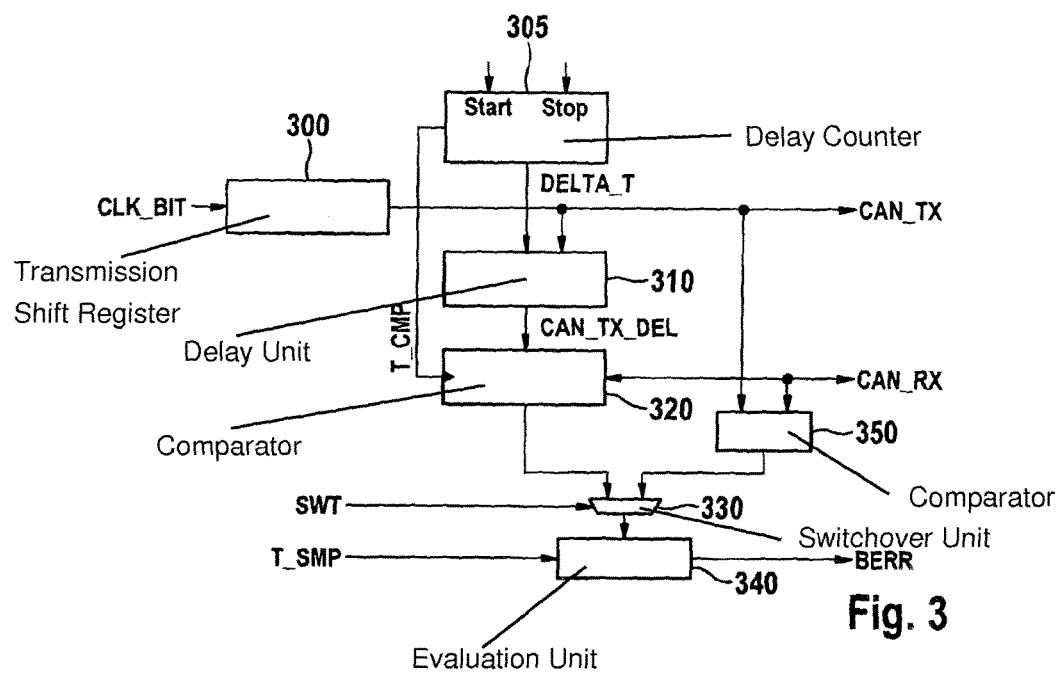
FIG. 3 shows a schematic block diagram of relevant components of one exemplary embodiment of a circuit according to the present invention.

FIG. 3 illustrates a block diagram of the relevant components of a circuit which carries out the method in a device according to the present invention. The device includes a transmission shift register 300, a delay counter 305, a delay unit 310, a comparator 320, a switchover unit 330, an evaluation unit 340, and a standard comparator 350. Of course, several of these components may have a combined or integrated design.

From transmission shift register 300, which is controlled via a connection to bit clock pulse CLK_BIT, with each bit clock pulse, i.e., once per bit length, one bit of the serial data stream to be transmitted is output as a transmission signal CAN_TX to the bus connection unit via the corresponding connecting line. Reception signal CAN_RX, which is received by the bus connection unit via a connecting line, is present at comparator 320 and standard comparator 350. By evaluating suitable edges such as the edge between EDL and r0 of transmission signal CAN_TX and of reception signal CAN_RX, a start signal and a stop signal for delay counter 305 are generated in the device, and the delay counter ascertains therefrom a time delay DELTA_T, for example by counting oscillator cycles of an oscillator which is present. In addition, the delay counter generates a comparison point T_CMP as a function of the measured time delay. For example, this comparison point may be generated as a sum of ascertained time delay DELTA_T and a predefined or predefinable percentage of the bit length, in particular one-half the bit length. The comparison point defines at which point in time the XOR linkage between delayed transmission signal CAN_TX_DEL and reception signal CAN_RX is evaluated in comparator 320.

Delay unit 310 generates from transmission signal CAN_TX and time delay DELTA_T, which is transmitted to it by delay counter 305, a transmission signal CAN_TX_DEL which is delayed by a delay time T_DELAY. In one particularly simple implementation, delay time T_DELAY may be an integral multiple of the (short) bit length, so that the delay unit offsets the bit sequence by only one or more bits. This may be implemented particularly easily using suitable hardware registers. Comparator 320 receives reception signal CAN_RX and delayed transmission signal CAN_TX_DEL. In addition, comparator 320 receives from delay counter 305 a piece of information T_CMP about a suitable comparison point at which the comparison result between reception signal CAN_RX and delayed transmission signal CAN_TX_DEL is to be scanned. Comparator 320 thus generates an output signal which reflects the result of the comparison and relays same to switchover unit 330, for example a multiplexer. At the same time, standard comparator 350, which may be designed as an XOR gate, for example, generates a second output signal which reflects the result of the comparison between CAN_TX and CAN_RX and which is likewise relayed to switchover unit 330. The device switches over switchover unit 330 between the two signals, for example via a suitable signal SWT and/or based on inputs made, which may include reaching or evaluating a predefined or predefinable bit, for example, so that either the output signal of standard comparator 350 or the comparator is present at evaluation unit 340. For example, the device switches over the switchover unit after the BRS bit, provided that a switchover to shorter bit lengths is present. In this case, the values of D1 and D2 are present at evaluation unit 340 at the crosses depicted in each case in FIG. 2c. In the evaluation unit, the particular signal which is switched through by the switchover unit is then scanned at configured sample point T_SMP, and a bit error signal BERR is generated as necessary if no match has been detected. As is apparent, reliable checking of the correct data transmission is possible, even for short bit lengths, using the device having the described design.

During normal operation of a motor vehicle, the presented transmission process is suitable for transmitting data between at least two control units of the motor vehicle which are connected via a suitable data bus. However, the transmission process is likewise advantageously usable during manufacture or maintenance of a motor vehicle for transmitting data between a programming unit, which for purposes of programming is connected to a suitable data bus, and at least one control unit of the motor vehicle which is connected to the data bus. It is also possible to use the method in industrial automation, for example for transmitting control information between distributed control units which are connected to one another via the bus and which control the sequence of an industrial manufacturing process. In this field, very long bus lines may also occur, and it may be particularly meaningful to operate the bus system for the arbitration phase with a relatively long bit length, for example for 16, 32, or 64 microseconds, so that the bus signals may propagate over the entire bus system as necessary during the arbitration process. As described, for a portion of the message a switchover to shorter bit lengths may subsequently be made so that the average transmission rate is not allowed to become too small.

As a whole, the method provides a transmission process which is characterized in that a CAN standard controller need only be minimally changed in order to operate according to the present invention. A communication controller according to the present invention, which may also operate as a CAN standard controller, is only negligibly larger than a conventional CAN standard controller. The speed of the data transmission may be significantly increased by using the expanded size of the data field and the shortened bit length. Extensive portions of the CAN conformance test (ISO 16845) may be taken over. It is also possible to combine the transmission process according to the present invention with the extensions of TTCAN (ISO 11898-4).

What is claimed is:

1. A method for checking a correct functioning of a serial data transmission in a bus system having at least two bus users, comprising:
   connecting the bus users to a bus via a bus connection unit;
   exchanging messages via the bus;
   granting a sending access to the bus for each message to a bus user via an arbitration process according to CAN standard ISO 11898-1, the bus user becoming a sender for the message, each message having a logic structure according to the CAN standard, the logic structure including a start of frame bit, arbitration field, control field, data field, CRC field, acknowledge field, and end of frame field; and
   checking, by the sender, a correct functioning of the data transmission during a transmission to send the message by comparing one of a transmission signal sent to the bus connection unit for transmission on the bus and a delayed transmission signal to a reception signal received by the bus connection unit from the bus, wherein the delayed transmission signal is delayed compared to the transmission signal by a delay time and held in the sender, the one of the transmission signal and the delayed transmission signal being used for checking the correct functioning of the data transmission as a function of a switchover between using the transmission signal and using the delayed transmission signal, the switchover occurring during the transmission to send the message.

2. The method as recited in claim 1, wherein the delay time (T_DELAY) is one of predefined and predefinable.

3. The method as recited in claim 1, wherein the delay time is a function of an ascertainment of one of a time delay and an averaged time delay.

4. The method as recited in claim 3, wherein the averaged time delay is ascertained from multiple messages sent in succession by mean value formation from multiple measured values, ascertained in succession, of the time delay.

5. The method as recited in claim 4, wherein the measured values which greatly deviate from the last determined mean value are sorted out during a formation of the mean value.

6. The method as recited in claim 5, wherein one of a threshold value for a difference and a limiting value for a ratio of an instantaneously present measured value and the last determined mean value above which the deviation from, or the ratio to, the mean value for which the absolute value has been classified as excessively large is settable.

7. The method as recited in claim 6, wherein the measured values of the time delay are managed in a list which is initialized by a suitable process upon system start-up, so that no invalid values are used in the formation of the mean value.

8. The method as recited in claim 7, wherein the ascertainment of the individual time delay takes place after the sending access has been granted to a bus user.

9. The method as recited in claim 8, wherein the ascertainment of the individual time delay includes a recognition in each case of one of at least one signal change and a signal edge in the transmission signal and in the reception signal.

10. The method as recited in claim 9, further comprising determining a comparison point in time for the checking of the correct functioning of the data transmission as a function of the ascertained time delay.

11. The method as recited in claim 10, wherein the comparison point in time for the checking of the correct functioning of the data transmission is determined as a sum of the ascertained time delay and one of a predefined and a predefinable percentage of a bit length.

12. The method as recited in claim 1, wherein the transmission signal is used for the checking during the arbitration process, and the delayed transmission signal is used for the checking for at least a portion of the transmission to send the message after the arbitration process.

13. The method as recited in claim 1, wherein a comparator carries out the comparing of the one of the transmission signal and the delayed transmission signal to the reception signal at a comparison point in time.

14. The method as recited in claim 1, further comprising, when an identifier is present in the message, performing a switchover to using a bit length for at least a portion of the message having a value that is shorter than a bit length used prior to the presence of the identifier.

15. A method for checking a correct functioning of a serial data transmission in a bus system having at least two bus users, comprising:
   connecting the bus users to a bus via a bus connection unit;
   exchanging messages via the bus;
   granting a sending access to the bus for each message to a bus user via an arbitration process according to CAN standard ISO 11898-1, the bus user becoming a sender for the message, each message having a logic structure according to the CAN standard, the logic structure including a start of frame bit, arbitration field, control field, data field, CRC field, acknowledge field, and end of frame field; and checking, by the sender, a correct functioning of the data transmission during a transmission to send the message by comparing one of a transmission signal sent to the bus connection unit for transmission on the bus and a delayed transmission signal to a reception signal received by the bus connection unit from the bus, wherein the delayed transmission signal is delayed compared to the transmission signal by a delay time and held in the sender, the one of the transmission signal and the delayed transmission signal being used for checking the correct functioning of the data transmission as a function of a switchover between using the transmission signal and using the delayed transmission signal, wherein the switchover takes place in response to reaching and evaluating one of a predefined and predefinable bit within the message.

16. The method as recited in claim 15, wherein the messages in which the switchover takes place are identified by a suitable identifier.

17. The method as recited in claim 16, wherein when a first identifier is present, the control field of the messages, in a deviation from the CAN standard, contains more than six bits.

18. The method as recited in claim 17, wherein the first identifier for messages having standard addressing takes place via a recessive second bit in the control field, and for messages having extended addressing, takes place via at least one of a recessive first bit and a second bit in the control field.

19. The method as recited in claim 18, wherein when the first identifier is present, a recessive bit of the first identifier is followed by at least one dominant bit in all data messages.

20. The method as recited in claim 19, wherein when the first identifier is present, an edge between the recessive bit of the first identifier and the at least one subsequent dominant bit is used for ascertaining the time delay between the transmission signal and the reception signal.

21. The method as recited in claim 20, wherein when the first identifier is present, the data field of the messages, in a departure from CAN standard ISO 11898-1, may contain more than eight bytes, for establishing the size of the data field, the values of the four bits of the data length code being interpreted differently from CAN standard ISO 11898-1, at least in part.

22. The method as recited in claim 21, wherein when a second identifier is present, a bit length for at least one of a predefined and a predefinable area within the message assumes a value that is shorter than a bit length used prior to a presence of the second identifier, an area beginning at the earliest with the second identifier, and ending at the latest with the CRC delimiter, the second identifier occurring only when the first identifier is present, and, in a deviation from CAN standard ISO 11898-1, occurring in a control field of the messages which contains more than six bits.

23. The method as recited in claim 22, wherein the second identifier is provided by a recessive bit in the control field which is transmitted chronologically after the bit of the first identifier.

24. The method as recited in claim 23, wherein when the second identifier is present, the recessive bit of the second identifier s separated from a recessive bit of the first identifier by at least one dominant bit.

25. The method as recited in claim 24, wherein when the second identifier is present, different values for bit timing parameters may be used in areas having a longer and a shorter bit length.

26. The method as recited in claim 25, wherein the different values of the bit length within the message are implemented by using different scaling factors (prescalers) for setting the bus time unit relative to one of a smallest time unit and an oscillator clock pulse during continuous operation.

27. The method as recited in claim 15, wherein the switchover takes place as a result of applying a signal to a switchover unit.

28. A device for checking a serial data transmission in a bus system having at least two bus users, the bus users being connected to a bus via a bus connection unit and exchanging messages via the bus, a sending access to the bus for each message being granted to a bus user via an arbitration process according to CAN standard ISO 11898-1, the bus user becoming the sender for the message, and each messages having a logic structure according to the CAN standard, the logic structure including a start of frame bit, arbitration field, control field, data field, CRC field, acknowledge field, and end of frame field, the device comprising:
an arrangement for checking a correct functioning of the data transmission during a transmission to send a message by comparing one of a transmission signal sent to the bus connection unit for transmission on the bus and a delayed transmission signal to a reception signal received by the bus connection unit from the bus, wherein the arrangement includes a comparator for carrying out the comparison of the delayed transmission signal with the reception signal at a comparison point in time;
a delay unit for providing the delayed transmission signal, which is delayed compared to the transmission signal by a delay time; and
a switchover unit to perform a switchover, between using the one of the transmission signal and the delayed transmission signal for checking the correct functioning of the data transmission, during the transmission to send the message.

29. The device as recited in claim 28, wherein the switchover unit is switchable at least one of as the result of one of reaching and evaluating one of a predefined and a predefinable bit within the message which has just been sent, and by applying a signal provided for this purpose.

30. The device as recited in claim 29, further comprising:
a delay counter for ascertaining a time delay between the transmission signal and the reception signal, and for providing a value for the time delay as a function of the result.

31. The device as recited in claim 30, further comprising:
a memory area for N entries of measured values of the time delay; and
a suitable controller for carrying out a mean value formation from entries of the memory area.

32. The device as recited in claim 31, further comprising:
an arrangement for connecting the bus users to a bus via the bus connection unit;
an arrangement for exchanging messages via the bus;
an arrangement for granting the sending access to the bus for each message to the bus user via the arbitration process according to CAN standard ISO 11898-1, the bus user becoming the sender for the message, each message having the logic structure according to the CAN standard, the logic structure including a start of frame bit, arbitration field, control field, data field, CRC field, acknowledge field, and end of frame field.

33. A method for checking a correct functioning of a serial data transmission in a bus system having at least two bus users, comprising:
- connecting the bus users to a bus via a bus connection unit;
- exchanging messages via the bus;
- granting a sending access to the bus for each message to a bus user via an arbitration process according to CAN standard ISO 11898-1, the bus user becoming a sender for the message, each message having a logic structure according to the CAN standard, the logic structure including a start of frame bit, arbitration field, control field, data field, CRC field, acknowledge field, and end of frame field; and
- checking, by the sender, a correct functioning of the data transmission during a transmission to send the message by comparing one of a transmission signal sent to the bus connection unit for transmission on the bus and a delayed transmission signal to a reception signal received by the bus connection unit from the bus, wherein the delayed transmission signal is delayed compared to the transmission signal by a delay time and held in the sender, the one of the transmission signal and the delayed transmission signal being used for checking the correct functioning of the data transmission as a function of a switchover between using the transmission signal and using the delayed transmission signal, the switchover occurring during the transmission to send the message, wherein the method is performed during normal operation of a motor vehicle for transmitting data between at least two control units of the motor vehicle which are connected via a suitable data bus.

34. The method as recited in claim 33, wherein the transmission signal is used for the checking during the arbitration process, and the delayed transmission signal is used for the checking for at least a portion of the transmission to send the message after the arbitration process.

35. A method for checking a correct functioning of a serial data transmission in a bus system having at least two bus users, comprising:
- connecting the bus users to a bus via a bus connection unit;
- exchanging messages via the bus;
- granting a sending access to the bus for each message to a bus user via an arbitration process according to CAN standard ISO 11898-1, the bus user becoming a sender for the message, each message having a logic structure according to the CAN standard, the logic structure including a start of frame bit, arbitration field, control field, data field, CRC field, acknowledge field, and end of frame field; and
- checking, by the sender, a correct functioning of the data transmission during a transmission to send the message by comparing one of a transmission signal sent to the bus connection unit for transmission on the bus and a delayed transmission signal to a reception signal received by the bus connection unit from the bus, wherein the delayed transmission signal is delayed compared to the transmission signal by a delay time and held in the sender, the one of the transmission signal and the delayed transmission signal being used for checking the correct functioning of the data transmission as a function of a switchover between using the transmission signal and using the delayed transmission signal, the switchover occurring during the transmission to send the message, wherein the method is used during operation of industrial control systems for transmitting data between at least two control units which are connected via a suitable data bus.

36. The method as recited in claim 35, wherein the transmission signal is used for the checking during the arbitration process, and the delayed transmission signal is used for the checking for at least a portion of the transmission to send the message after the arbitration process.

37. A method for checking a correct functioning of a serial data transmission in a bus system having at least two bus users, comprising:
- connecting the bus users to a bus via a bus connection unit;
- exchanging messages via the bus;
- granting a sending access to the bus for each message to a bus user via an arbitration process according to CAN standard ISO 11898-1, the bus user becoming a sender for the message, each message having a logic structure according to the CAN standard, the logic structure including a start of frame bit, arbitration field, control field, data field, CRC field, acknowledge field, and end of frame field; and
- checking, by the sender, a correct functioning of the data transmission during a transmission to send the message by comparing one of a transmission signal sent to the bus connection unit for transmission on the bus and a delayed transmission signal to a reception signal received by the bus connection unit from the bus, wherein the delayed transmission signal is delayed compared to the transmission signal by a delay time and held in the sender, the one of the transmission signal and the delayed transmission signal being used for checking the correct functioning of the data transmission as a function of a switchover between using the transmission signal and using the delayed transmission signal, the switchover occurring during the transmission to send the message, wherein the method is performed during one of a manufacture and a maintenance of a motor vehicle for transmitting data between a programming unit, which for purposes of programming is connected to a suitable data bus, and at least one control unit of the motor vehicle which is connected to the data bus.

38. The method as recited in claim 37, wherein the transmission signal is used for the checking during the arbitration process, and the delayed transmission signal is used for the checking for at least a portion of the transmission to send the message after the arbitration process.

* * * * *